(12) United States Patent
Cheng et al.

(10) Patent No.: US 7,065,011 B2
(45) Date of Patent: Jun. 20, 2006

(54) METHOD FOR ADJUSTING MECHANICAL ERROR OF OPTICAL DISC READING DEVICE

(75) Inventors: Jung-Tsung Cheng, Kaohsiung (TW); Cheng-Chieh Chuang, Sanchung (TW)

(73) Assignee: Benq Corporation, Taoyuan (TW)

( * ) Notice: Subject to any disclaimer, the term of this patent is extended or adjusted under 35 U.S.C. 154(b) by 471 days.

(21) Appl. No.: 10/457,640

(22) Filed: Jun. 9, 2003

(65) Prior Publication Data
US 2003/0227848 A1  Dec. 11, 2003

(30) Foreign Application Priority Data
Jun. 11, 2002  (TW) ............... 91112660 A

(51) Int. Cl.
*G11B 7/00* (2006.01)
(52) U.S. Cl. ............... 369/44.28; 369/44.32; 369/53.12; 369/53.23
(58) Field of Classification Search ............ None
See application file for complete search history.

(56) References Cited

U.S. PATENT DOCUMENTS 6,493,296 B1 * 12/2002 Fukumoto et al. ....... 369/44.32
6,549,493 B1 *  4/2003 Nakamura et al. ....... 369/44.32

* cited by examiner

*Primary Examiner*—Muhammad Edun
(74) *Attorney, Agent, or Firm*—Snell & Wilmer L.L.P.

(57) ABSTRACT

The present invention provides a method for adjusting the mechanical error of an optical disc reading device. The optical disc reading device consists of a driving device and an optical pickup. The driving device has a base plate for supporting and rotating an optical disc. The method consists of moving the optical pickup to surface of optical disc, the optical pickup emitting two tracking light spots onto the surface, and the optical pickup reciprocally moving relative to the surface. Next, the optical pickup reads reflected signal of two tracking light spots for generating a track crossing signal. By using the track crossing signal, the method adjusts position of optical pickup relative to the base plate.

22 Claims, 8 Drawing Sheets

METHOD FOR ADJUSTING MECHANICAL ERROR OF OPTICAL DISC READING DEVICE

CROSS REFERENCE TO RELATED APPLICATIONS

This Application claims priority to Taiwan Patent Application No. 0911 12660 filed on Jun. 11, 2002.

FIELD OF THE INVENTION

The present invention relates to a method for adjusting the mechanical error. In particular, the present invention relates to a method for examining and adjusting the mechanical error of an optical disc reading device.

BACKGROUND OF THE INVENTION

An optical disc device typically includes tracking servo control. The optical disc device emits a beam of light to a particular position of a track on the disc when the optical disc device records, replays or erases the data of the optical disc. The optical disc device obtains the tracking error by detecting the reflected beam from the spot on the optical disc. The tracking servo control corrects the tracking error to zero, hence the light spot falls on the accurate position of the track of the optical disc. There is a detailed description about the technology correcting tracking error in the U.S. Pat. No. 5,828,634.

FIG. 1A and FIG. 1B are schematic diagrams for explaining how to obtain a traditional track crossing signal. As shown in FIG. 1A, the pit track 112 and the land track 114 are disposed alternatively on the surface of the optical disc 110. Generally, the data are recorded in the pit track 112. The radial direction of the optical disc 110 is the track crossing direction which is presented as arrow "X". The tangential direction of the optical disc 110 is the rotating direction which is presented as arrow "Y".

The traditional three-beam method for obtaining the track crossing signal is to use a laser to impinge on the surface of the optical disc 110 and generate three spots on the surface of the optical disc 110. The main spot 117, the subordinate spot 116 and the other subordinate spot 118 are substantially located in a line. The difference in brightness of the reflected light corresponding to the subordinate spots 116 and 118 approaches to zero when the main spot 117 falls on a pit track 112.

As shown in FIG. 1B, when the main spot 117 falls on the track crossing position, the half part of the main spot 117 falls on the pit track 112 and the other half part falls on the land track 114. There is a maximum value of the absolute value of the difference in brightness of the reflected lights corresponding to the subordinate spots 116 and 118. By utilizing the difference in brightness, the track crossing signal can be obtained.

FIG. 1C is a schematic diagram of a traditional track crossing signal observed on the oscilloscope. When the optical disc 110 is rotating and the optical pickup is fixed, the reflected lights corresponding to the subordinate spots 116 and 118 are read, transformed, and operated to generate a track crossing signal 120. The track crossing signal 120 shown on the oscilloscope includes a continuous sine wave and cosine wave and the wave number and the amplitude relate to the parameters which are set in the oscilloscope. A wave envelope of wave peak 122 can be obtained by connecting several wave peaks of the track crossing signal 120. Also, a wave envelope of wave troughs 124 can be obtained by connecting several wave troughs of the track crossing signal 120.

Point "A" is on the wave envelope 122 of wave peaks, point "B" corresponds to point "A" and is on the wave envelope 124 of wave troughs. The difference of amplitude of these two points is a maximum "Am1", and the maximum "Am1" corresponds to the maximum absolute value of the difference in brightness of reflected lights corresponding to the subordinate spots 116 and 118 as shown in FIG. 1B.

However, the defect of the optical disc 110, such as an eccentric optical disc, makes the resulting track crossing signal different from the track crossing signal 120 shown in FIG. 1C. The mechanism and quality of the components of the optical disc device also cause the track crossing signal to be different from the track crossing signal 120 shown in FIG. 1C. Thus, it is desired to improve the disc-reading capability of the optical disc device.

SUMMARY OF THE INVENTION

One aspect of the present invention provides a method for adjusting the mechanical error of the optical disc reading device. The reading efficiency of the optical disc reading device is improved by the method.

Another aspect of the present invention provides a method for examining the mechanical error of the optical disc reading device. The mechanical error of the optical disc reading device can be examined by analyzing the track crossing signal.

Another aspect of the present invention provides an optical disc reading device for adjusting the mechanical error of the optical pickup. The optical pickup of the optical disc reading device is adjusted by the screws according to the fluctuation of the track crossing signal. The adjustment minimizes the mechanical error and improves the reading efficiency of the optical disc reading device.

The present invention provides a method for adjusting the mechanical error of the optical disc reading device. The optical disc reading device includes an optical pickup and a driving device including a base plate for supporting and rotating an optical disc. In the first step of the method, the optical pickup is moved to the surface of the optical disc. In the second step, the optical pickup emits two tracking light spots onto the surface and the base plate performs a relative movement between the tracking light spots and the track on the surface. Next, the optical pickup reads the reflected light to generate a track crossing signal. The mechanical error is examined using the track crossing signal and the relative position between the optical pickup and the base plate is adjusted according to the track crossing signal.

The present invention provides an optical disc reading device for adjusting the mechanical error of the optical pickup. The optical disc reading device includes an optical pickup, a base plate and guide bars. The base plate has a center and supports an optical disc. The guide bars include an end terminal and define a moving trace. The guide bars guide a relative movement between the optical pickup and the optical disc. The feature of the optical disc reading device resides in having at least a screw on the end terminal. The screw adjusts the guide bars making the moving trace to pass through the center of the base plate.

DETAILED DESCRIPTION

When illustrating an exemplary embodiment of the present invention with the provided two-dimensional diagram, persons skilled in the art can understand the actual configuration of an optical disc reading device or a disc includes a three-dimensional construction and these two-dimensional diagrams are not intended to be construed in a limiting sense. Furthermore, to better illustrate the present invention, the provided schematic diagrams of optical disc reading device and track crossing signal are intentionally not enlarged in the same scale. In addition, to focus on the problem to be solved by the present invention, the schematic diagrams provided to illustrate the present invention do not include other irrelevant components or structures of the optical disc device. The optical disc device includes other components or structures in actual operation which are not shown in diagrams presented.

Figure 2:
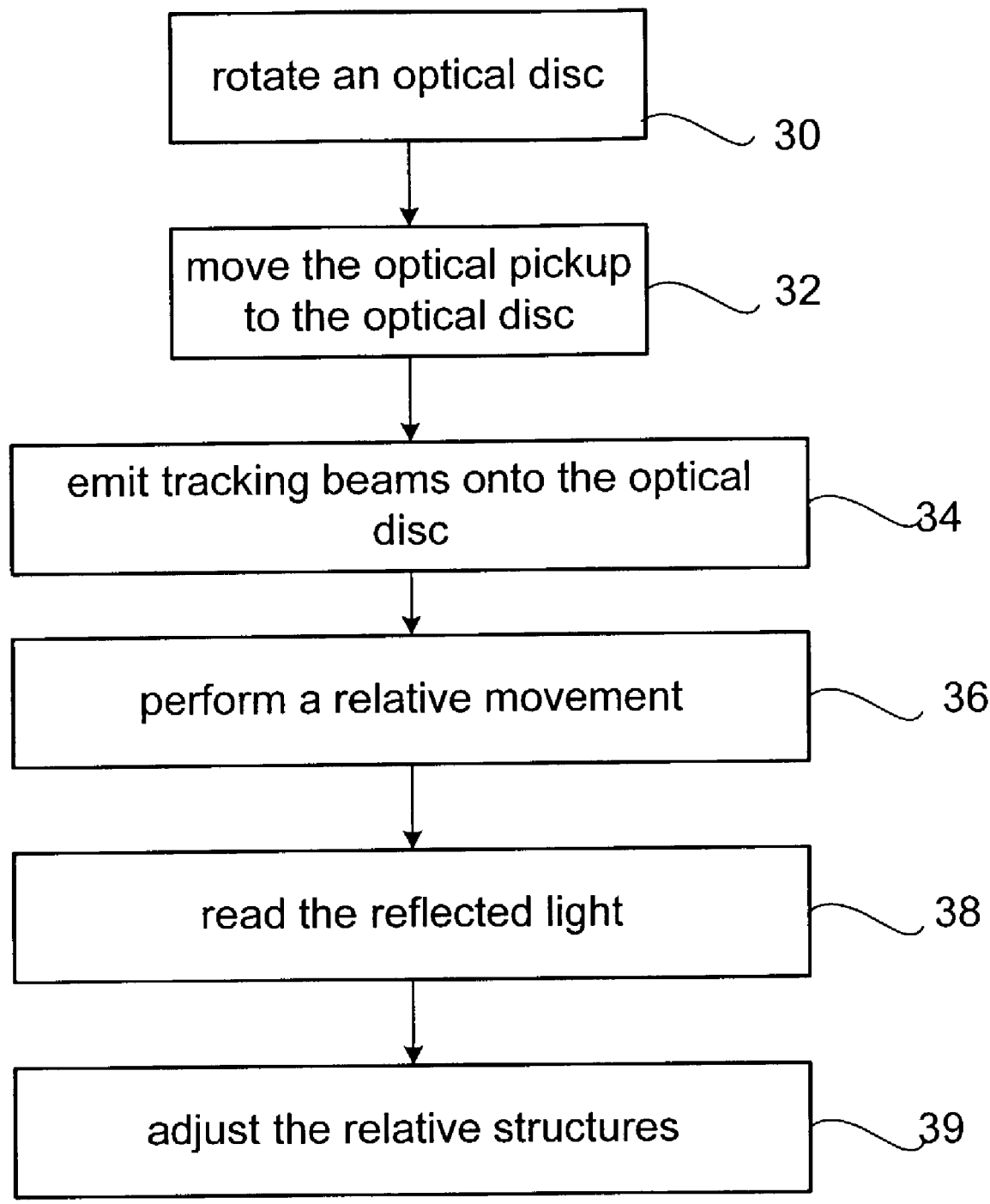
FIG. 2 is a flow chart of the present invention.

The present invention is a method for adjusting mechanical error of an optical disc reading device. The optical disc reading device includes a driving device and an optical pickup including a base plate. FIG. 2 is a flow diagram of the present invention. In step 30, the base plate supports and rotates an optical disc. In step 32, the optical pickup is moved to the optical disc. In step 34, the optical pickup emits two tracking beams onto the optical disc. In the step 36, the driving device performs a relative movement between the optical pickup and the track on the optical disc. In the present invention, step 34 and step 36 can be exchanged reversely. In step 38, the optical pickup reads the reflected light from the surface of optical disc corresponding to two tracking beams. Same as the prior art, a track crossing signal is acquired by transforming and calculating the brightness of the reflected light. The track crossing signal can also be read and shown on a typical oscilloscope. In step 39, the present invention utilizes the track crossing signal to determine mechanical error of the optical disc reading device and adjusts the relative structures of components of the optical disc reading device by observing fluctuation of the track crossing signal. For example, a maximum value of peak-to-peak of track crossing signal is resulted by changing the relative position between the optical pickup and the base plate.

Figure 3A:
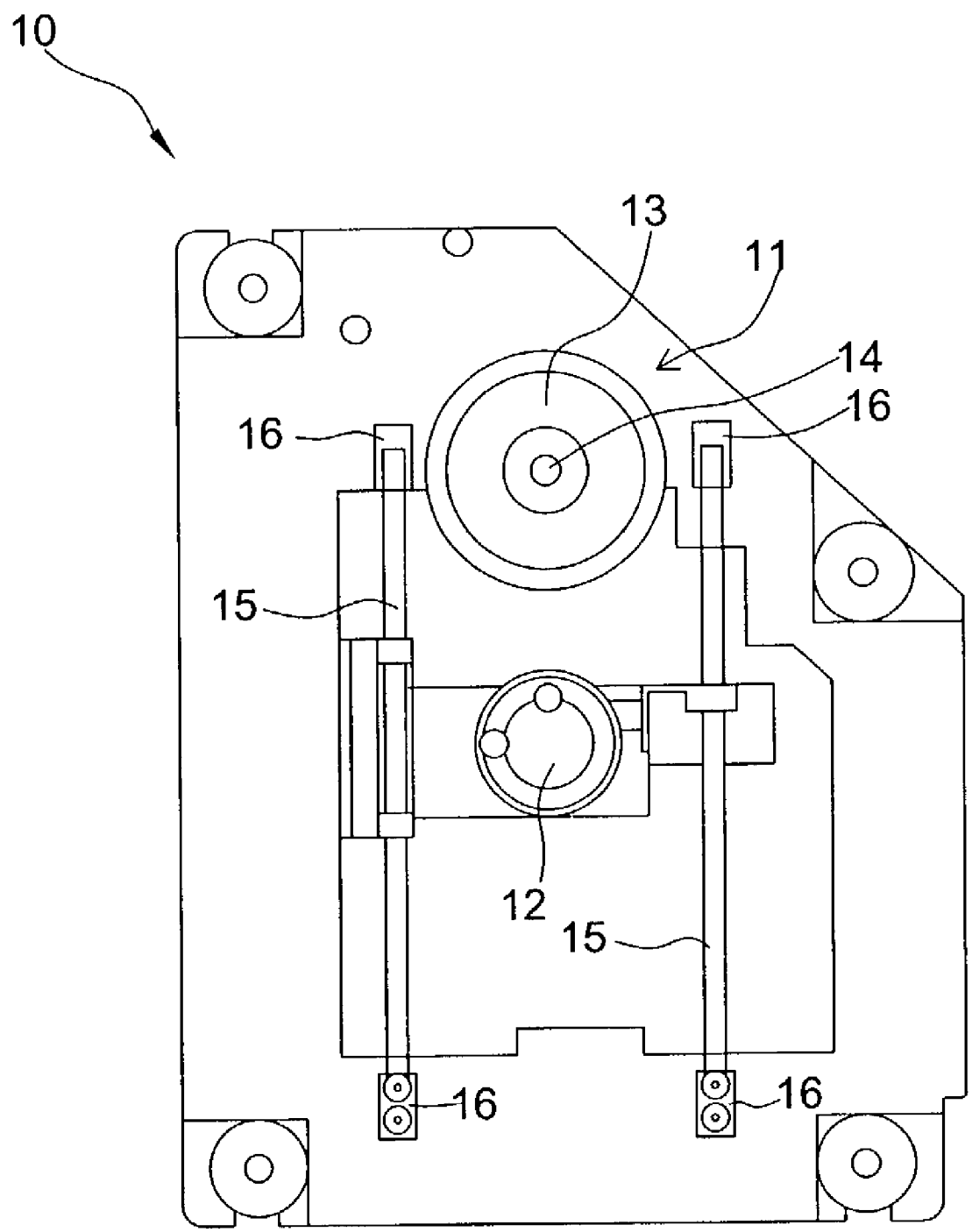
FIG. 3A is a top view of an optical disc reading device for explaining how the present invention uses an optical disc to examine the mechanical error of the optical disc reading device.

FIG. 3A is a top-view diagram of the major portion of the optical disc reading device and is used to explain an exemplary embodiment of the present invention. An optical disc reading device 10 includes a driving device 11 and an optical pickup 12. The driving device 11 includes a base plate 13 for supporting and rotating an optical disc (not show in the diagram). The driving device 11 drives the optical disc to pass through the center 14 of the base plate 13 and rotates the optical disc around an axle perpendicular to the surface of the optical disc. The driving device 11 also includes a device, e.g., a gear wheel (not shown in the diagram) for performing a relative movement between the optical pickup 12 and the base plate 13. The base plate 13 includes guide bars 15 on both sides. The guide bars 15 provide a moving trace and guide the optical pickup 12 to move along the moving trace. The guide bars 15 have a support 16 on the ends for connecting the guide bars 15.

The embodiment of the invention uses a non-eccentric optical disc which is placed on the base plate 13. The center of optical disc coincides with the center 14 of the base plate 13. When the driving device 11 rotates the optical disc, the pit track and the land track also rotate along the axle as described above. Then, the driving device 11 drives the optical pickup 12 to move along to the guide bars 15. It means that the optical pickup 12 moves relatively to the base plate 13. When the optical pickup 12 moves to the surface of the optical disc, the optical pickup 12 emits two tracking beams and forms two tracking light spots on the surface of the optical disc. The optical pickup 12 reads the light which is reflected from the surface corresponding to the two tracking light spots. The optical disc reading device 10 transforms the brightness of the reflected light and generates a track crossing signal shown on the oscilloscope.

Figure 1A:
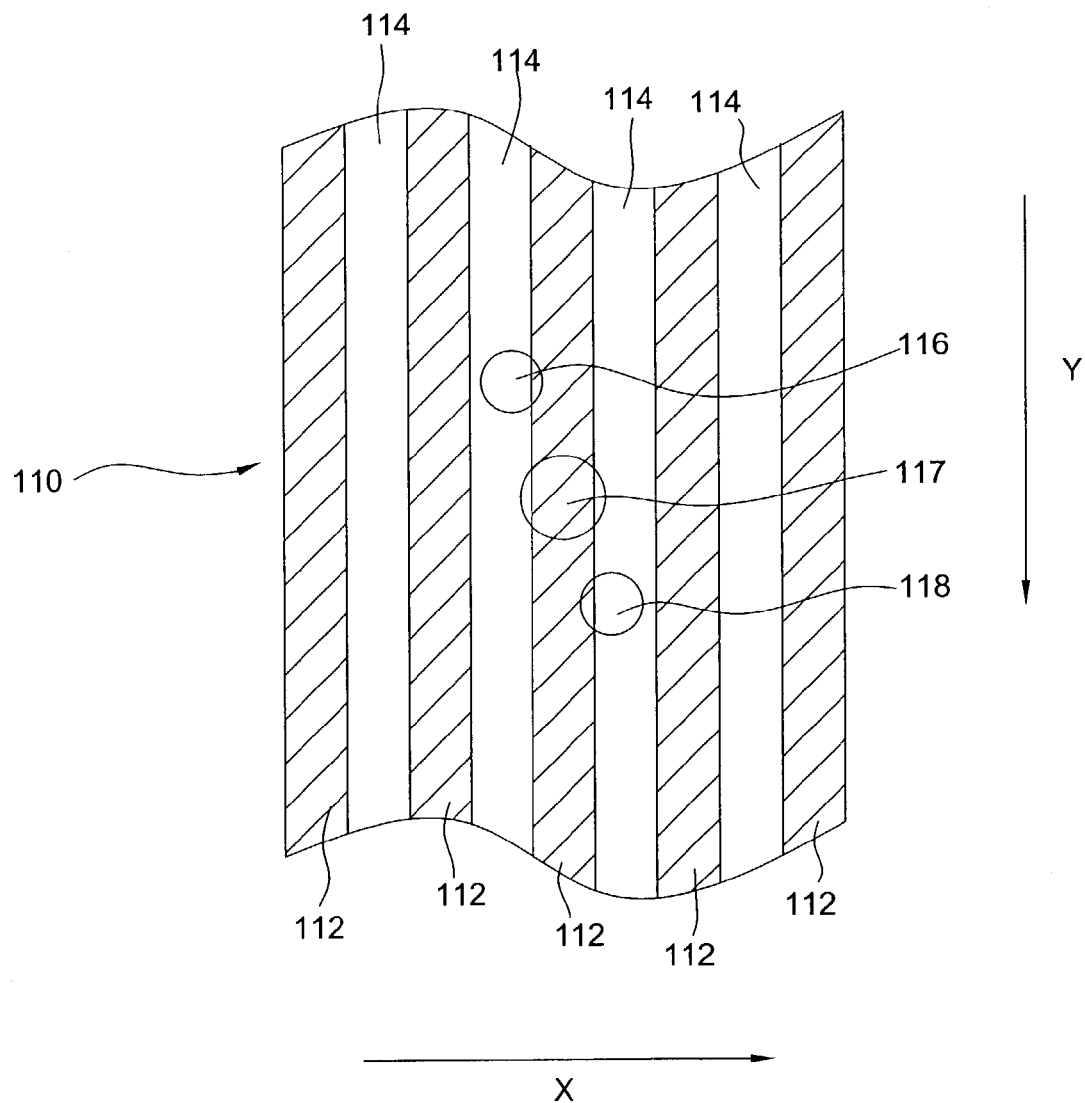
FIG. 1A and FIG. 1B are schematic diagrams for explaining how to obtain a traditional track crossing signal.
Figure 1B:
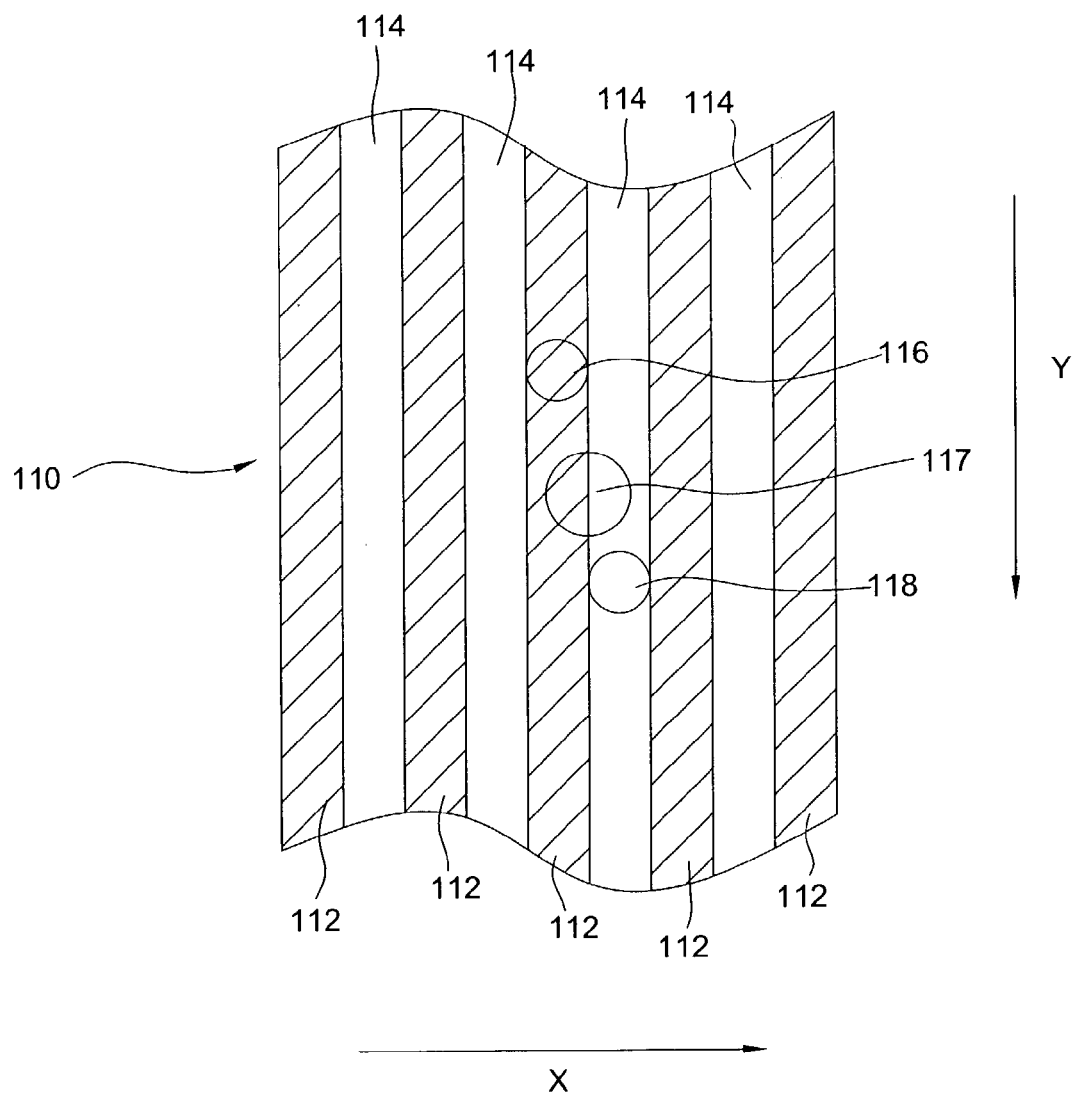
Figure 1C:
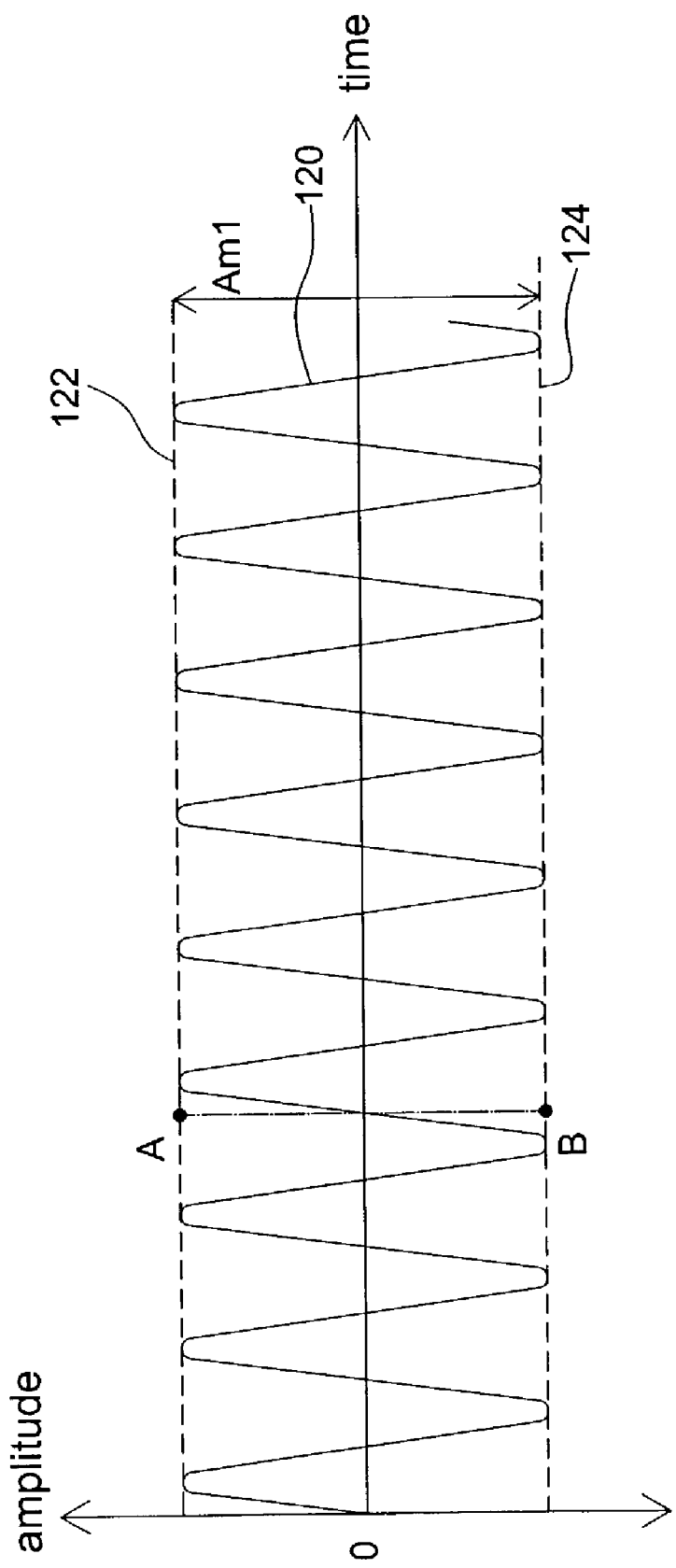
FIG. 1C is a schematic diagram showing a traditional track crossing signal.

Nevertheless, in the embodiment of the present invention, the mechanical error of the optical disc reading device 10 causes the moving trace to not pass through the center 14 of the base plate 13. Consequently, after transformation and calculation, the absolute value of the difference of the brightness of the reflected light is smaller than the maximum value "Am1" depicted in FIG. 1C.

Figure 3B:
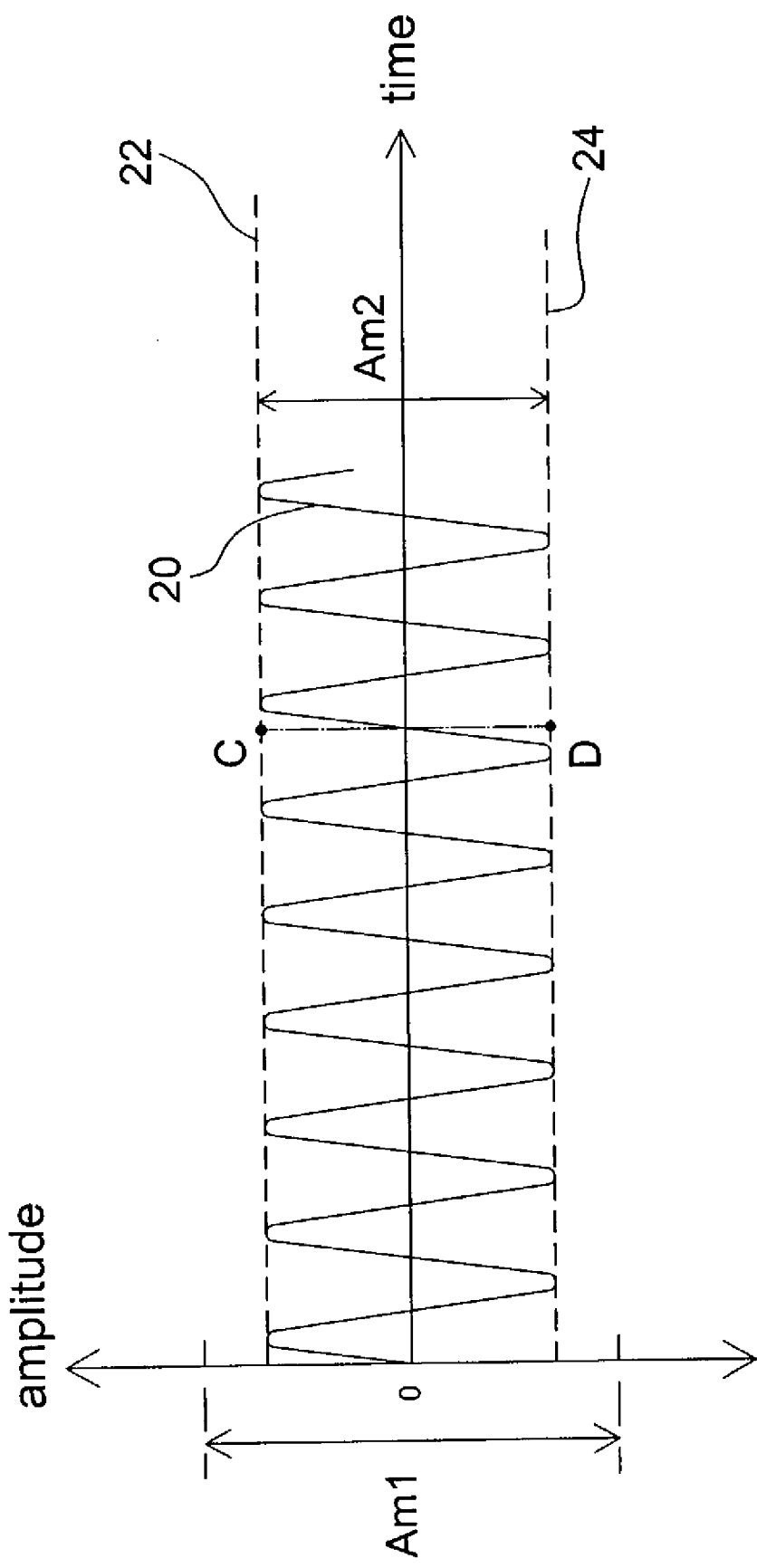
FIG. 3B is a schematic diagram of the track crossing signal obtained using the device of FIG. 3A.

FIG. 3B is a diagram of the track crossing signal based on the embodiment. As FIG. 3B shows, a plurality of wave peaks of a track crossing signal 20 forms a wave envelope 22 and a plurality of wave troughs of the track crossing signal 20 forms a wave envelope 24. A point "C" of the wave envelope 22 and a point "D" of the wave envelope 24 are selected as datum points. The point "C" corresponds to point "D" and the difference of amplitude is "Am2". "Am2" is smaller than the maximum value "Am1" in FIG. 1C. The track crossing signal 20 of this type is easily observed when the optical pickup 12 moves closer to the center 14.

Figure 3C:
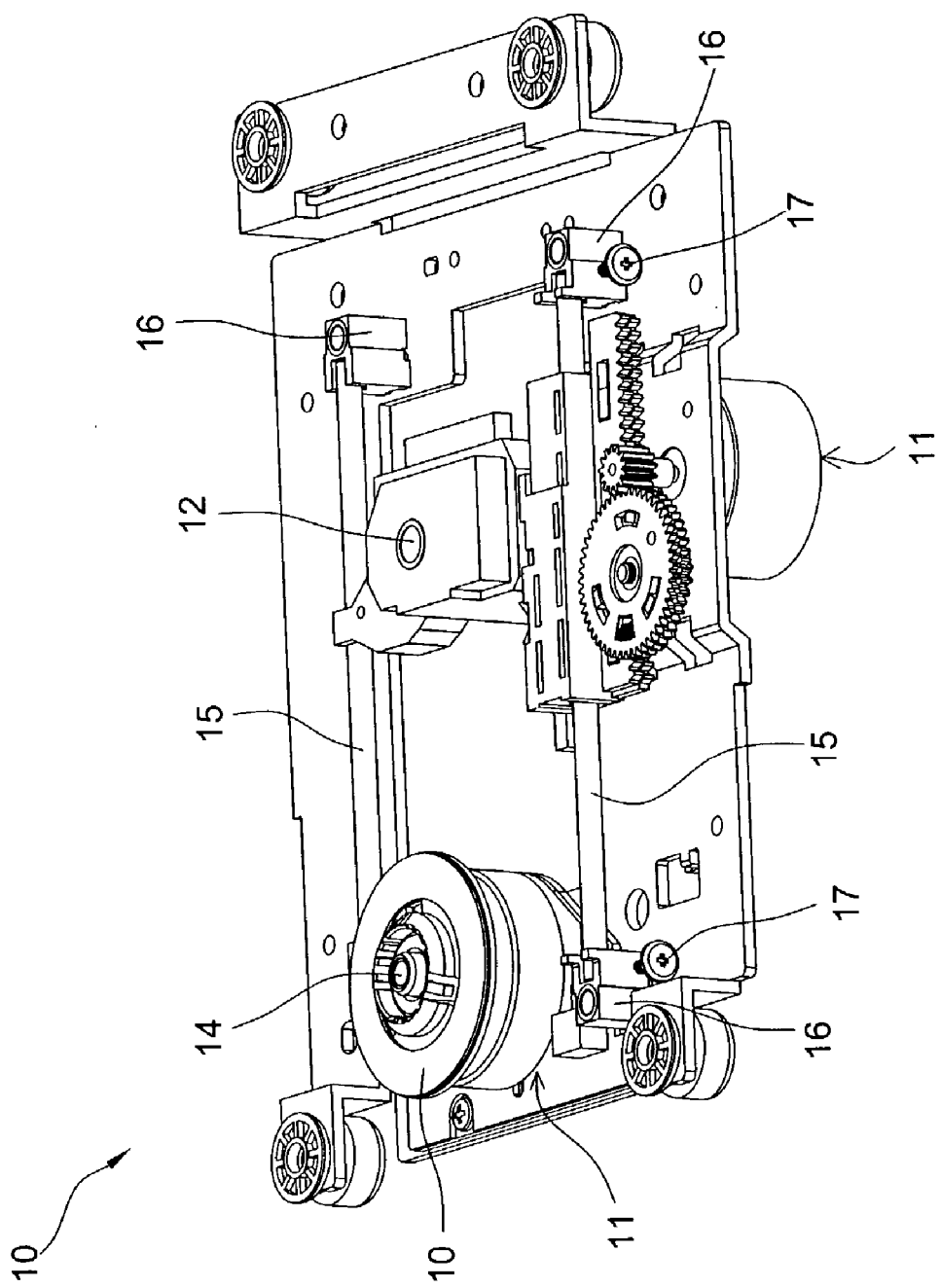
FIG. 3C is a side view of an optical disc reading device for explaining how the present invention uses an optical disc to examine and adjust the mechanical error of the optical disc reading device.

The present invention utilizes the track crossing signal 20 obtained to examine mechanical error of the optical disc reading device 10. The mechanical error causes the moving trace to not pass through the center 14 of the base plate 13. Furthermore, the present invention uses the track crossing signal 20 obtained and an extra adjustment mechanism for reducing the mechanical error of the optical disc reading device 10. FIG. 3C is a schematic diagram of an optical disc reading device to illustrate the adjustment mechanism of the present invention. The screws 17 are provided on the support 16 to adjust the position of the guide bars 15. Then, the screws 17 adjust the moving trace to pass through the center 14 of the base plate 13.

In the process of adjustment, a corresponding variation of the difference of amplitude is obtained by observing the track crossing signal 20. When the moving trace is adjusted to approach or pass through the center 14 of the base plate 13, the difference of amplitude, "Am2", increases gradually to approach or equal to the maximum value, "Am1". When the moving trace is moved away from the center 14, the difference of amplitude, "Am2", decreases gradually. Consequently, in the process of the adjustment, when the maximum difference of amplitude, "Am2", appears, it means the mechanical error of optical disc reading device is reduced to a minimum. In the exemplary embodiment, the mechanical error is adjusted for maximizing the difference of amplitude, "Am2", to a maximum value, "Am1", or a maximum value of peak-to-peak without mechanical error.

Figure 4A:
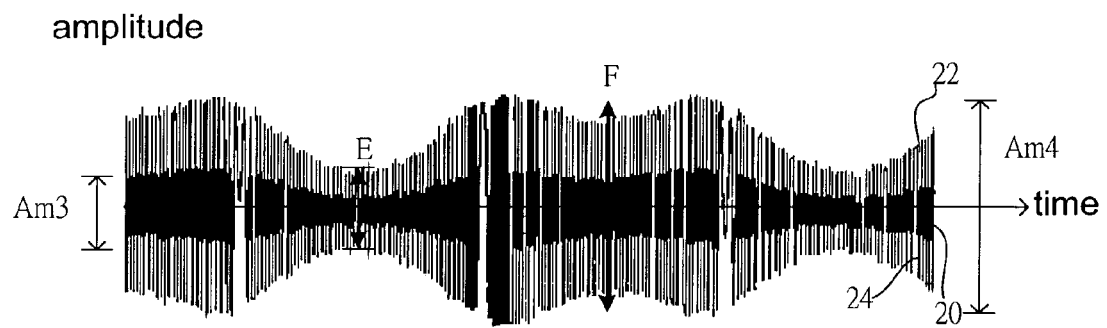
FIG. 4A and FIG. 4B are schematic diagrams of the track crossing signal when an eccentric disc is used to examine the mechanical error of the optical disc reading device.
Figure 4B:
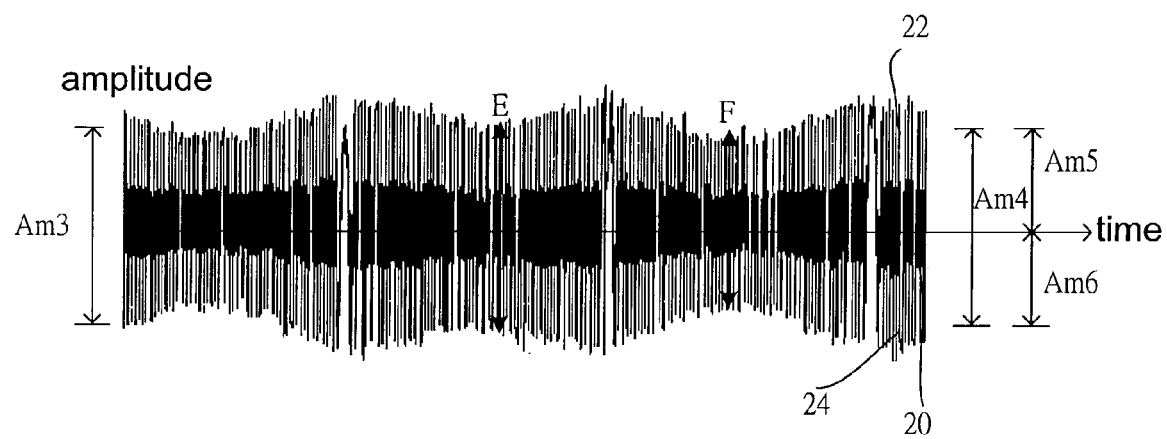

FIG. 4A and FIG. 4B are two schematic diagrams of track crossing signal according to the present invention utilizing an eccentric optical disc to examine the mechanical error of optical disc reading device. As shown in FIG. 4A, there are two points "E" and "F" of adjacent wave troughs on the wave envelope 22 defined by wave peaks of the track crossing signal 20. And the two points respectively correspond to two points of adjacent wave peaks on the wave envelope 24 defined by wave troughs of the track crossing signal 20. The difference of amplitude, "Am3" and "Am4", are obviously different. That is to say, the eccentric error of the optical disc and the mechanical error of optical disc reading device make the adjacent difference of amplitude, "Am3" and "Am4", very different. The track crossing signal 20 of this type is observed more easily when the optical pickup 12 approaches to the center 14.

As shown in FIG. 3C, the screws 17 adjust the position of the guide bars 15 and make the moving trace to pass through the center 14 of the base plate 13. During the process, since the optical disc reading device 10 is examined using the eccentric optical disc, from the track crossing signal 20, shown in FIG. 4B, it is observed the difference of amplitude "Am3" and "Am4" are almost equal. It means that the mechanical error of optical disc reading device 10 is very small.

As described above, the present invention provides an optical reading device capable of adjusting the mechanical error of optical pickup. The optical reading device at least includes an optical pickup, a base plate and guide bars. The base plate includes a center and supports an optical disc. The guide bars include an end terminal which defines a moving trace and guide the optical pickup and optical disc to perform a relative movement on the moving trace. The feature of the optical reading device includes at least a screw which is disposed on the end terminal. The guide bars are adjusted to make the moving trace passing through the center by the screws.

In the foregoing specification the invention has been described with reference to specific exemplar aspects thereof. It will, however, be evident that various modification and changes may be made thereto without departing from the broader spirit and scope of the invention. The specification and drawings are, accordingly, to be regarded in an illustrative rather than restrictive sense.

What is claimed is:

1. A method for adjusting a moving trace of an optical pickup of an optical disc reading device, said optical disc reading device comprising a driving device, said driving device comprising a base plate for supporting and rotating an optical disc having a surface, said surface having at least one track, said method comprising:
    moving said optical pickup to said surface along said moving trace, said optical pickup emitting tracking light spots onto said surface;
    performing relative movement between said tracking light spots and said track along said moving trace;
    generating a track crossing signal by reading reflected signals from said surface corresponding to said tracking light spots; and
    adjusting said moving trace of said optical pickup relative to said base plate according to said track crossing signal.

2. The method according to claim 1, wherein said track crossing signal comprises a sine wave.

3. The method according to claim 2, wherein said adjusting step is performed to have a maximum value of peak-to-peak of said sine wave.

4. The method according to claim 2, wherein said sine wave comprises a plurality of peaks together defining a wave envelope, said wave envelope comprises a plurality of envelope troughs, and said adjusting step causes values of said envelope troughs to be substantially equal to one another.

5. The method according to claim 2, wherein said sine wave comprises a plurality of troughs together defining a wave envelope, said wave envelope comprises a plurality of envelope peaks, and said adjusting step causes values of said envelope peaks to be substantially equal to one another.

6. The method according to claim 1, wherein said track crossing signal comprises a cosine wave.

7. The method according to claim 6, wherein said adjusting step is performed to have a maximum value of peak-to-peak of said cosine wave.

8. The method according to claim 6, wherein said cosine wave comprises a plurality of peaks together defining a wave envelope, said wave envelope comprises a plurality of envelope troughs, and said adjusting step causes values of said envelope troughs to be substantially equal to one another.

9. The method according to claim 6, wherein said cosine wave comprises a plurality of troughs together defining a wave envelope, said wave envelope comprises a plurality of envelope peaks, and said adjusting step causes values of said envelope peaks to be substantially equal to one another.

10. A method for examining a moving trace of an optical pickup of an optical disc reading device, said optical reading device comprising a driving device, said driving device including a base plate for supporting and rotating a disc, said disc having a surface, said surface having at least one track, said method comprsing:
    moving said optical pickup along said moving trace to said surface, for emitting tracking light spots on said surface;
    performing relative movement between said tracking light spots and said track along said moving trace;
    reading the reflected signals of said tracking light spots;
    calculating said reflected signals to generate a track crossing signal; and
    examining if said track crossing signal is optimized.

11. The method according to claim 10, wherein said track crossing signal comprises a sine wave.

12. The method according to claim 11, wherein said examining step examines if a maximum value of peak-to-peak of said sine wave is obtained.

13. The method according to claim 11, wherein said sine wave comprises a plurality of troughs together defining a wave envelope, said wave envelope comprises a plurality of envelope peaks, and said examining step examines if values of said plurality of envelope peaks are substantially equal to one another.

14. The method according to claim 11, wherein said sine wave comprises a plurality of peaks together defining a wave envelope, said wave envelope comprises a plurality of envelope troughs, and said examining step examines if values of said plurality of envelope troughs are substantially equal to one another.

15. The method according to claim 10, wherein said track crossing signal comprises a cosine wave.

16. The method according to claim 15, wherein said examination step examines if a maximum value of peak-to-peak of said cosine wave is obtained.

17. The method according to claim 15, wherein said cosine wave comprises a plurality of troughs together defining a wave envelope, said wave envelope comprises a plurality of envelope peaks, and said examining step examines if values of said plurality of envelope peaks are substantially equal to one another.

18. The method according to claim 15, wherein said cosine wave comprises a plurality of peaks together defining a wave envelope, said wave envelope comprises a plurality of envelope troughs, and said examining step examines if values of said plurality of envelope troughs are substantially equal to one another.

19. An optical disc reading apparatus for operating an optical disc, said optical disc having a surface with at least one track, comprising:

a base plate for supporting and rotating said optical disc;

an optical pickup for omitting tracking light spots on said surface so that a track crossing signal is generated by reading reflected signals from said surface corresponding to said tracking light spots;

a guiding unit for providing a moving trace to guide said optical pickup to said surface;

a driving device for moving said optical pickup along said moving trace; and adjustment unit for adjusting said moving trace of said optical pickup relative to said base plate.

20. The optical disc reading apparatus according to claim 19, wherein said adjustment unit adjusts said moving trace of said optical pickup relative to said base plate according to said track crossing signal.

21. The optical disc reading apparatus according to claim 20, wherein said track crossing signal comprises a sine wave, and said moving trace is adjusted to obtain a maximum value of peak-to-peak of said sine wave.

22. The optical disc reading apparatus according to claim 19, wherein said adjustment unit is configured to horizontally move said guiding unit relative to said optical disc so as to adjust said moving trace of said optical pickup relative to said base plate.

* * * * *

UNITED STATES PATENT AND TRADEMARK OFFICE
CERTIFICATE OF CORRECTION

| | | |
|---|---|---|
| PATENT NO. | : 7,065,011 B2 | Page 1 of 1 |
| APPLICATION NO. | : 10/457640 | |
| DATED | : June 20, 2006 | |
| INVENTOR(S) | : Cheng et al. | |

It is certified that error appears in the above-identified patent and that said Letters Patent is hereby corrected as shown below:

Col. 7, claim 19, the third paragraph should read as follows:

--an optical pickup for emitting tracking light spots on said surface so that a track crossing signal is generated by reading reflected signals from said surface corresponding to said tracking light spots;--

Signed and Sealed this

Twenty-ninth Day of April, 2008

JON W. DUDAS
*Director of the United States Patent and Trademark Office*